(12) United States Patent
Dooley

(10) Patent No.: US 7,841,184 B2
(45) Date of Patent: Nov. 30, 2010

(54) START FLOW MEASUREMENT

(75) Inventor: Kevin Allan Dooley, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 894 days.

(21) Appl. No.: 11/737,157

(22) Filed: Apr. 19, 2007

(65) Prior Publication Data

US 2008/0256954 A1    Oct. 23, 2008

(51) Int. Cl.
  *F02C 7/22* (2006.01)
  *F02C 7/26* (2006.01)
(52) U.S. Cl. .............. 60/778; 60/790; 60/786; 60/776; 60/733; 701/100; 701/123; 702/45
(58) Field of Classification Search ............... 60/778, 60/790, 786, 776, 733; 701/100, 123; 702/45
  See application file for complete search history.

(56) References Cited

U.S. PATENT DOCUMENTS

| | | | |
|---|---|---|---|
| 3,344,602 A | 10/1967 | Davies et al. | |
| 3,596,467 A | 8/1971 | Avery | |
| 4,206,595 A | 6/1980 | Cole | |
| 4,539,809 A | 9/1985 | Stanley et al. | |
| 4,964,270 A | 10/1990 | Taylor et al. | |
| 5,095,694 A | 3/1992 | Shekleton et al. | |
| 5,137,046 A | 8/1992 | Sollman et al. | |
| 5,277,023 A | 1/1994 | Bradley et al. | |
| 5,528,897 A | 6/1996 | Halin | |
| 5,701,732 A | 12/1997 | Nesbitt et al. | |
| 5,809,771 A | 9/1998 | Wernberg | |
| 5,896,737 A | 4/1999 | Dyer | |
| 5,927,067 A | 7/1999 | Hanloser et al. | |
| 5,966,926 A | 10/1999 | Shekleton et al. | |
| 6,079,198 A | 6/2000 | Prowse et al. | |
| 6,158,208 A | 12/2000 | Hommema | |
| 6,195,978 B1 | 3/2001 | Futa, Jr. | |
| 6,314,998 B1 | 11/2001 | Futa, Jr. et al. | |
| 6,334,296 B2 | 1/2002 | Futa, Jr. et al. | |
| 6,385,962 B2 | 5/2002 | Futa, Jr. et al. | |
| 6,442,925 B1 | 9/2002 | Dalton et al. | |
| 6,536,217 B2 | 3/2003 | Lipinski et al. | |
| 6,619,025 B2 | 9/2003 | Wernberg | |
| 6,666,015 B2 | 12/2003 | Dyer | |
| 6,666,029 B2 * | 12/2003 | Ryan ..................... | 60/776 |
| 6,675,570 B2 | 1/2004 | Herbison et al. | |

(Continued)

FOREIGN PATENT DOCUMENTS

GB    1 456 976    12/1976

(Continued)

OTHER PUBLICATIONS

U.S. Appl. No. 11/409,213, Not yet published, DOOLEY (Applicant's co-pending application ).

(Continued)

*Primary Examiner*—Michael Cuff
*Assistant Examiner*—Craig Kim
(74) *Attorney, Agent, or Firm*—Ogilvy Renault LLP

(57) ABSTRACT

A method and apparatus for measuring a start fuel flow to a pilot nozzle of a fuel system of a gas turbine engine using pressure differential between fuel passages leading to fuel nozzles.

16 Claims, 4 Drawing Sheets

U.S. PATENT DOCUMENTS

| | | |
|---|---|---|
| 6,675,583 B2 | 1/2004 | Willis et al. |
| 6,751,939 B2 | 6/2004 | Futa, Jr. et al. |
| 6,804,946 B2 | 10/2004 | Willis et al. |
| 6,807,801 B2 | 10/2004 | McCarty |
| 6,877,306 B2 | 4/2005 | Wernberg et al. |
| 6,883,329 B1 | 4/2005 | Martling |
| 6,892,544 B2 | 5/2005 | Futa, Jr. et al. |

FOREIGN PATENT DOCUMENTS

| | | |
|---|---|---|
| GB | 2 419 180 | 4/2006 |
| WO | WO 81/00282 | 2/1981 |
| WO | 99/58835 | 11/1999 |

OTHER PUBLICATIONS

U.S. Appl. No. 11/737,160, Not yet published, DOOLEY (Applicant's co-pending application.

International Search Report mailed on Jul. 18, 2008, on Applicant's corresponding PCT International Patent Applicant No. PCT/CA2008/000693.

* cited by examiner

START FLOW MEASUREMENT

TECHNICAL FIELD

The invention relates generally to gas turbine engines and more particularly, to an improved fuel system for gas turbine engines.

BACKGROUND OF THE ART

During a gas turbine engine starting, fuel is first provided to primary fuel nozzles which function as pilot nozzles, in order to deliver a very small amount of fuel near to the igniter system in the combustor for ignition at these nozzles to produce pilot torches in the combustor. Fuel is then provided to a set of main fuel nozzles, often through a manifold, to deliver the fuel at a relatively higher fuel pressure and high flow rate to start and maintain the continuous combustion in the combustor. The start flow needs to be accurately delivered and is normally metered by a metering valve/pump in demand fuel pumping systems. Controlling the start fuel flow with the metering valve/pump may lead to flow accuracy problems, given the factor that the fuel flow is in a very small amount in contrast to the maximum fuel flow to be pumped by the demand fuel pump, and that pump wear over the life of the pump could lead to problems with metering the start fuel flows. It is also desirable to eliminate the fuel metering valve/pump as a cost and weight savings.

Accordingly, there is a need to provide an improved low fuel flow metering control of a fuel system of gas turbine engines.

SUMMARY

In one aspect, provided is a method for measuring a start fuel flow to a pilot nozzle in a fuel system of a gas turbine engine for ignition in a combustion chamber during an engine start procedure, the fuel system including a first fuel passage leading to the pilot nozzle and a second fuel passage leading to a main manifold, both the pilot nozzle and main manifold being in fluid communication with the combustion chamber, the method comprising: a) measuring a pressure differential between the first fuel passage and the second fuel passage while the start fuel flow is being directed through the first fuel passage to the pilot nozzle, until a light-up condition of the pilot nozzle is detected; and b) calculating the start fuel flow using a flow number of the pilot nozzle and a measured value of the pressure differential.

In another aspect, provided is an apparatus for determining a start fuel flow to a pilot nozzle of a fuel system for ignition in a combustion chamber of a gas turbine engine, the apparatus comprising: a differential pressure transducer connected between first and second fuel passages of the fuel system, the first fuel passage leading to the pilot nozzle and the second fuel passage leading to a main manifold, both the pilot nozzle and the main manifold being in fluid communication with the combustion chamber; and means for calculating the start fuel flow using a known flow number of the pilot nozzle and a measured value of the differential pressure transducer.

In another aspect, provided is fuel system of a gas turbine engine which comprises a fuel pump for pressurizing fuel from a fuel source; at least a first nozzle in fluidic communication with a combustion chamber of the engine; at least a second nozzle in fluidic communication with the combustion chamber of the engine; a fluidic connection extending from the fuel pump and dividing into at least first and second passages leading to the respective first and second nozzles; a differential pressure transducer connected between the first and second passages of the fluidic connection for measuring a pressure differential between the first and second passages; and a control unit in contact with the fluidic connection for controllably operating the fuel system, the control unit including a device for using a measured value of the differential pressure transducer to calculate a start fuel flow through the first passage before a light-up condition of the first nozzle is detected.

Further details of these and other aspects will be apparent from the detailed description and figures included below.

DESCRIPTION OF THE DRAWINGS

Reference is now made to the accompanying figures in which.

DETAILED DESCRIPTION OF THE PREFERRED EMBODIMENTS

Figure 1:
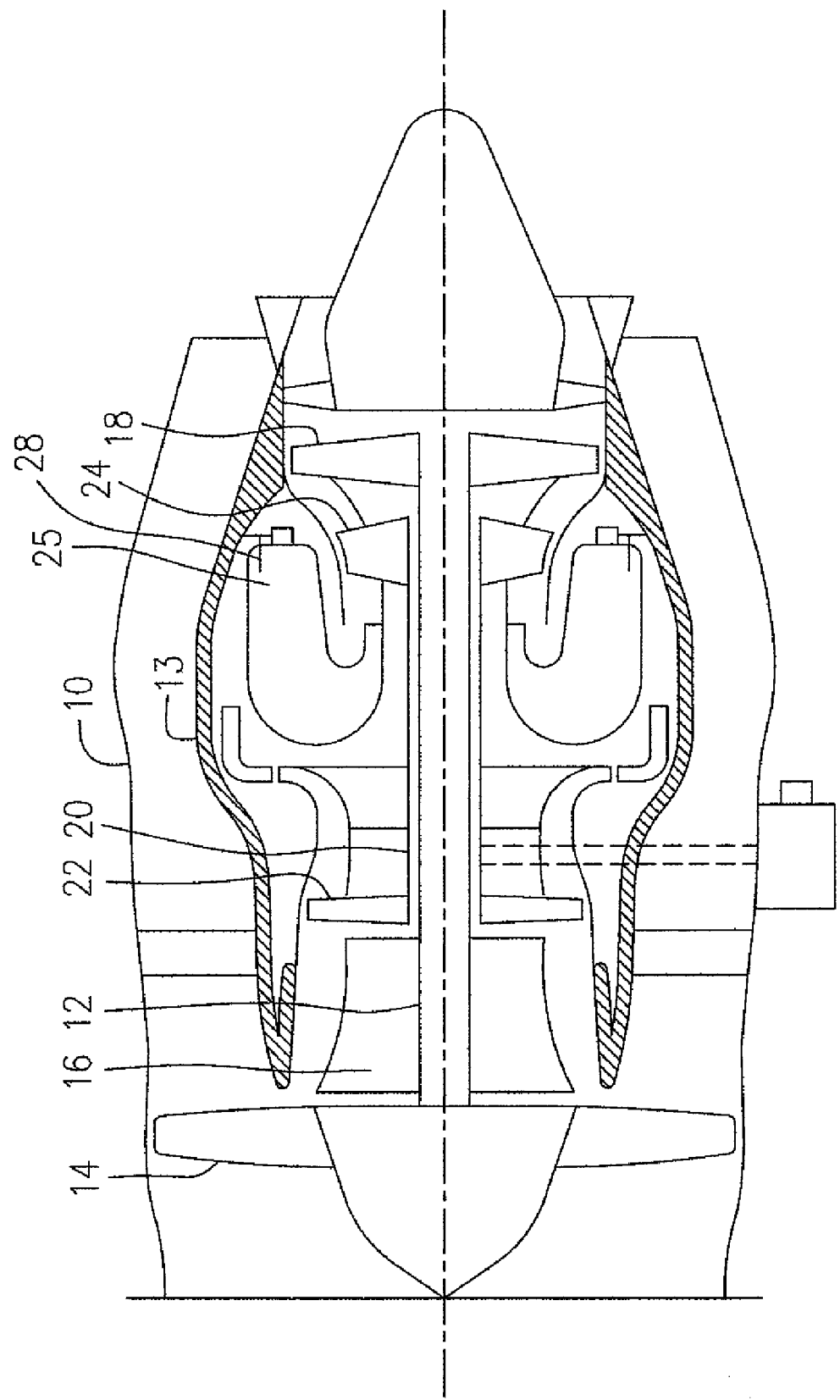
FIG. 1 is a schematic cross-sectional view of a turbofan gas turbine engine.

Referring to FIG. 1, a turbofan gas turbine engine incorporating an embodiment of the present approach includes a bypass duct 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assemblies 12 and 20 in order to define a main fluid path (not indicated) therethrough. In the main fluid path there are provided a combustor seen generally at 25 and a fuel system 28, including fuel nozzles (not depicted in FIG. 1) for delivery of fuel to the combustor 25 for combustion. The compressor assemblies 16 and 22 provide a compressed airflow (not indicated) through the main fluid path and in communication with the combustor 25 for combustion therein.

Figure 2:
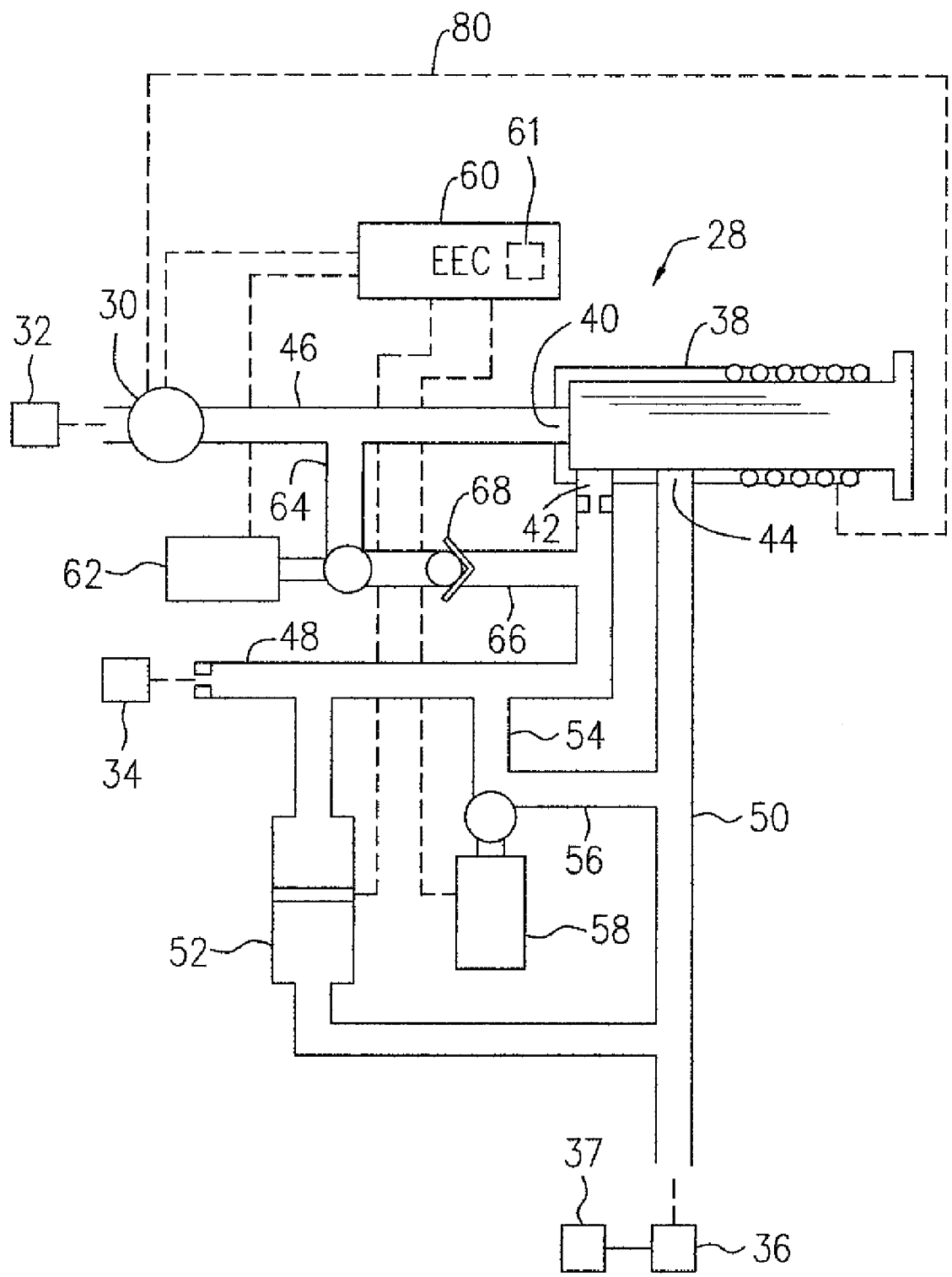
FIG. 2 is a schematic illustration of a fuel system used for the engine of FIG. 1, showing one embodiment of the present technique.

Referring to FIGS. 1 and 2, the fuel system 28 according to one embodiment, comprises a fuel pump 30 (a vane type of fuel pump is preferred, which is driven independent of the high pressure spool) for pressurizing the fuel to establish a fuel pressure under which fuel is delivered from a fuel source 32 through a fluidic connection of the fuel system 28 preferably to at least one pilot nozzle 34 such as a torch nozzle or some other form of primary nozzle, which is used to initialize ignition of combustion in a combustion chamber defined by the combustor 25, and a main manifold 36 of the combustor 25 which distributes fuel to a plurality of main fuel nozzles 37 (only one shown) of the combustor 25 in order to supply fuel for combustion within the combustor 25. Both the pilot nozzle 34 and the main fuel nozzles 37 of the main manifold 36 are in fluid communication with the combustion chamber which, in turn, is in a fluidic communication with an outlet stage of the compressor 22. The fluidic connection of the fuel system 28 further includes, for example, a minimum pressure/flow divider valve 38 having an inlet 40 and outlets 42, 44, which are normally closed under a spring force of the minimum pressure/flow divider valve 38. The minimum pressure/flow divider valve 38 is adapted to open the outlet 42 only when inlet 40 is exposed to a low pressure which is equal to or above a predetermined minimum pressure threshold, but is lower than a predetermined high pressure threshold, or to open both outlets 42 and 44 when inlet 40 is exposed to a high pressure, which is equal to or above the predetermined high pressure threshold. This will be further discussed with reference to the system operation process.

A fuel flow passage 46 interconnects the fuel pump 30 and the inlet 40 of the minimum pressure/flow divider valve 38, and a fuel flow passage 48 is connected between the outlet 42 and the pilot nozzle 34. There is a fuel flow passage 50 extending between the outlet 44 of the minimum pressure/flow divider valve 38 and the main manifold 36 in a parallel relationship with the fuel flow passage 48. It should be noted that due to the flow rate difference between the required fuel flow to the pilot nozzle 34 (the igniter flow) and the fuel flow to the main manifold 36 (the manifold flow), the fuel flow passage 48 is sized in cross-section smaller than the fuel flow passage 50, thereby resulting in a high flow resistance of the fuel flow passage 48 relative to the fuel flow passage 50.

A differential pressure transducer 52 is preferably connected between the fuel flow passage 48 and the fuel flow passage 50 such that a pressure differential between fuel flow passages 48 and 50 can be monitored from time to time and particularly during engine start up while no fuel flow is delivered to the main manifold 36. The differential pressure transducer 52 is electrically connected to an electrical engine control (EEC) 60 such that the pressure differential between the fuel flow passages 48 and 50 monitored by the differential pressure transducer 52, can be used by EEC 60 as a reference signal for controlling the operation process of the fuel system 28.

A flow equalization solenoid valve 58 is preferably connected by fuel flow passages 54, 56 to the respective fuel flow passages 48 and 50, in a parallel relationship with the differential pressure transducer 52. The flow equalization solenoid valve 58 is a normally open valve to allow a fluidic communication between the fuel flow passages 48 and 50 when the minimum pressure/flow divider valve 38 closes outlets 42 and 44 thereof. The flow equalization solenoid valve 58 is electrically connected to and controlled by EEC 60 and is adapted to close the fuel flow passages 54, 56 when a control signal is received from the EEC 60.

The differential pressure transducer 52 is in fluidic connection with the respective pilot nozzle 34 and the main fuel nozzles 37 via the main manifold 36 which are, in turn, in fluid communication with the combustion chamber, which is supplied with air pressure from the compressor, for example, P3 compressor air. However, the pressure measured in the combustion chamber is somewhat lower than the P3 compressor air pressure due to a pressure drop across the combustor liner, and is indicated as P4 combustion chamber air pressure. Therefore, the P4 combustion chamber air pressure is automatically provided to the differential pressure transducer 52 as a reference pressure via fuel flow passage 50, when the flow equalization solenoid valve 58 is in the closed position and outlet 44 of the minimum pressure/flow divider valve 38 is closed (when the compressor 22 is rotated either by the turbine 24 or by a starter) for monitoring the pressure differential between the fuel flow passages 48 and 50. For example, the pressure differential between the fuel flow passages 48 and 50 monitored by the differential pressure transducer 52, can be used for monitoring a fuel flow through the fuel flow passage 48 to the pilot nozzle 34 during the engine start-up process, and to determine when to deactivate the flow equalization solenoid valve 58 to open the fuel flow passages 54, 56 in order to allow the fuel flow to pass through the fuel flow passage 50 to the main manifold 36. This will be further described hereinafter.

An ecology solenoid valve 62 is preferably provided to control fuel flow passages 64, 66 which are connected to the respective fuel flow passages 46 and 48 to form a bypass over the minimum pressure/flow divider valve 38. The ecology solenoid valve 62 is normally closed and is electrically connected to EEC 60. The ecology solenoid valve 62 can be controlled by EEC 60 to selectively open for establishing the fluidic connection of the fuel system 28 between the fuel source 32 and the main fuel nozzles 37 of the main manifold 36, as well as the pilot nozzle 34 when required.

A check valve 68 is optionally provided within the fuel flow passage 66. Should the ecology valve 62 be opened in malfunction, the check valve 68 ensures that the bypass connection over the minimum pressure/flow divider valve 38 should be used only for fuel flowing therethrough back to the fuel pump 30 and the fuel source 32, but not for fuel supply therethrough from the fuel pump 30.

Figure 3:
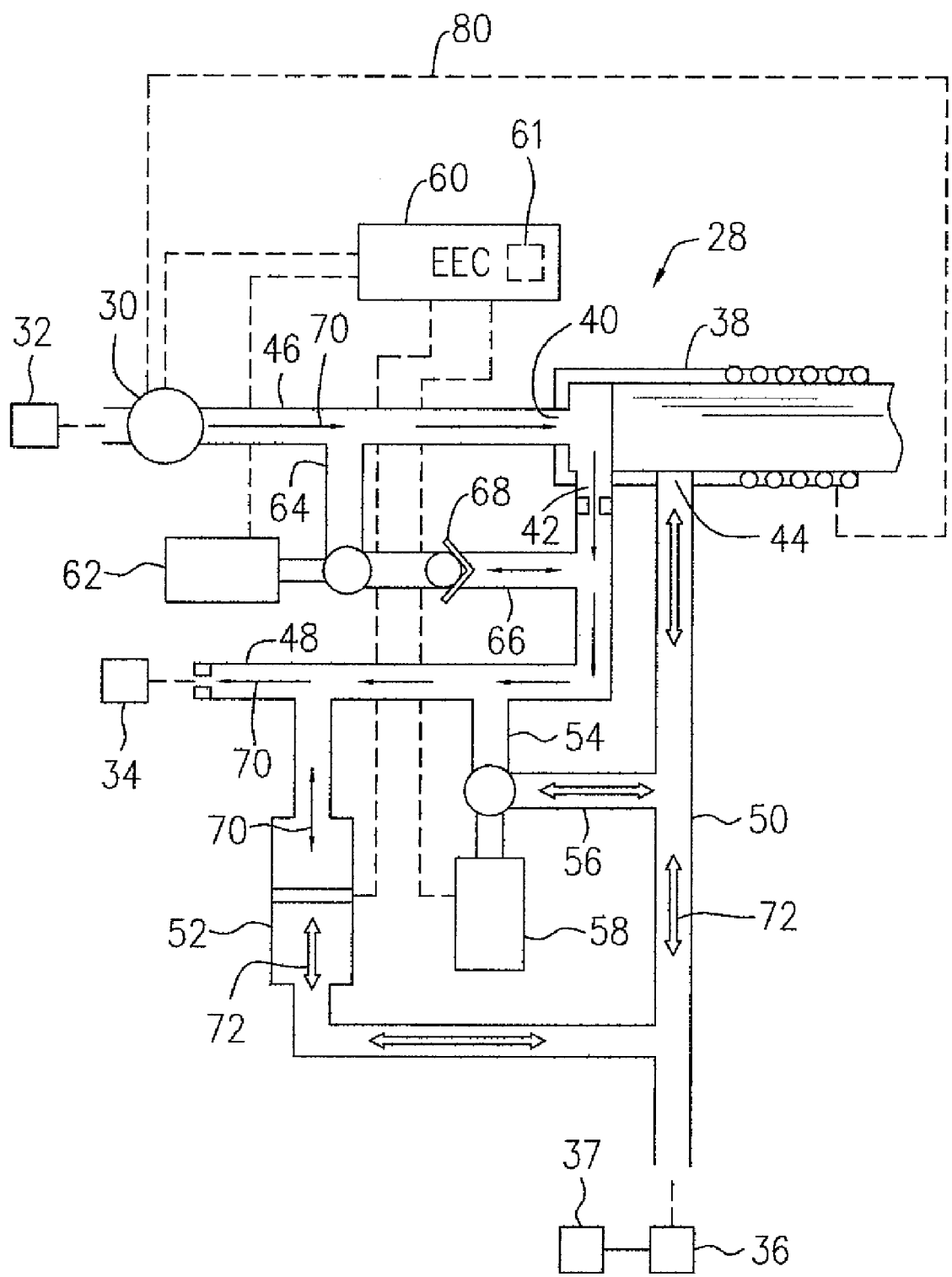
FIG. 3 is a schematic illustration of the fuel system of FIG. 2, showing a step of the fuel system operation for supplying a start flow to a pilot nozzle while a main manifold is in a dry condition.
Figure 4:
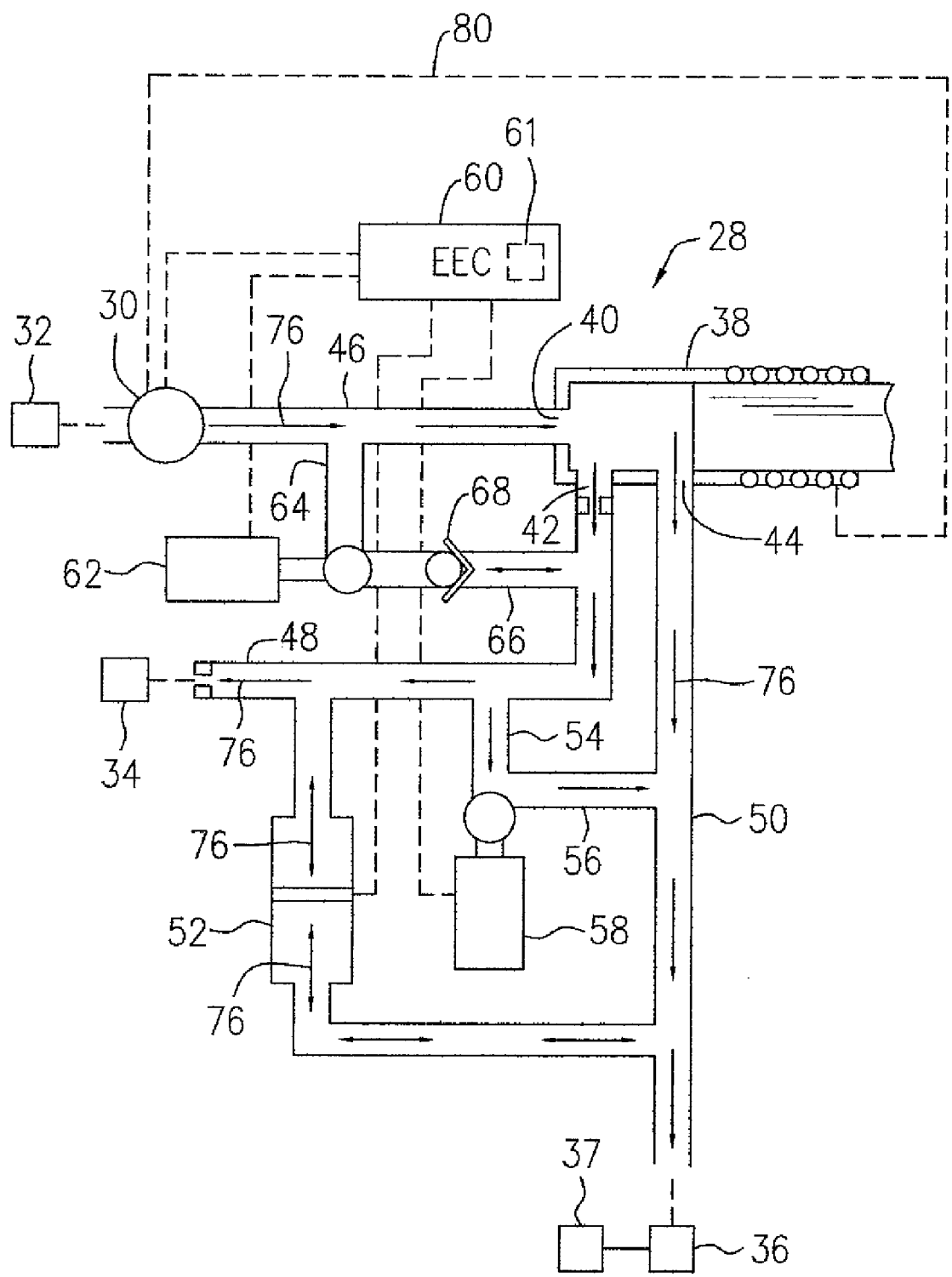
FIG. 4 is a schematic illustration of the fuel system of FIG. 2, showing a further step of the fuel system operation for supplying both the start flow and main manifold flow under a high fuel pressure to the respective pilot torch nozzle and the main manifold of the combustor.

FIGS. 3-4 illustrate the steps of operation of the fuel system 28. For convenience of description, different numerals in those Figures are used in connection with arrows to indicate fluid flows under pressure differentials having different values. A single head arrow indicates the direction of the fluid flow and a double head arrow indicates the fluid flow is blocked.

Referring to FIG. 3, EEC 60 controls the fuel pump 30 to operate at a speed to establish the low fuel pressure during engine start conditions. The low fuel pressure forces the minimum pressure/flow divider valve 38 to open the inlet 40 and outlet 42, allowing a fuel flow indicated by arrow 70 to pass through the fuel passages 46, 48 to the pilot nozzle 34. The ecology solenoid valve 62 is normally closed such that there is no fuel flow through the bypass formed by the fuel flow passages 64, 66. The flow equalization solenoid valve 58 is activated by EEC 60 to be closed during the initial engine start condition such that there is no fuel flow passing through fuel flow passage 50 to the main manifold, either via the minimum pressure/flow divider valve 38 or via the fuel flow passages 54, 56. The fuel flow passage 50 and the main manifold 36 may remain in a dry condition (empty of fuel), having a pressure therein equal to the air pressure in the combustor 25 of FIG. 1, i.e. the P4 combustion chamber air pressure. The air inside of the fuel flow passage 50 and the main manifold 36 under such air pressure conditions, is indicated by the hollow double-head arrows 72. The low fuel pressure in the fuel flow passages 46, 48 is higher than the pressure in the fuel flow passage 50, thereby forming a pressure differential therebetween. The pressure differential is monitored by the differential pressure transducer 52 which sends corresponding signals to EEC 60. A measured value (which may be a varying value) of the differential pressure transducer 52 is indicated as ΔP.

It should be noted that a relatively low range (i.e. sensitive) pressure transducer may be preferred for the purpose of monitoring flow during start and fuel pulses on manifold filling. It is preferable to use a sensitive or low range pressure transducer in practical terms, because the transducer never has a high pressure differential applied to it. The differential pressure is shunted out via fuel passages 54 and 56 in conjunction with flow equalization valve 58, limiting the maximum differential pressure to which the transducer is exposed. For example, the differential pressure during start may be of the order of 120 PSI maximum, however the fuel system pressure may be over 1000 PSI during take off conditions. A transducer used for applications involving 1000 PSI is very poor at resolving small pressure differentials needed to control flow at low flow conditions. Therefore, it is optional to have a transducer having a maximum pressure indication for example, not greater than 150 PSI.

During the engine start procedure, the low start fuel flow to the pilot nozzle 34 is accurately controlled by adjustment of fuel pump 30 which in turn is controlled by EEC 60. Nevertheless, such accurate control of the low start fuel flow is based on the accurate metering of the low start fuel flow, which is achieved by a start fuel flow calculating software 61 which may be included in EEC 60 using the measured values of pressure differential by the differential pressure transducer 52, in this embodiment If Pp is used to indicate the low fuel pressure established by the fuel pump 30 during the engine start procedure as shown in FIG. 3, the start fuel flow 70 can be calculated as $F=PN(Pp-P4)^{1/2}$ wherein F represents the calculated amount of start fuel flow 70 and PN represents the flow number of the pilot nozzle 34. It is understood that Pp–P4 represents the pressure differential which causes the start fuel flow 70 because the start fuel flow 70 is driven by the established low fuel pressure Pp against the combustion chamber air pressure P4 to which the pilot nozzle 34 is exposed. It is further noted that the air pressures inside the empty passage 50 and the main manifold 36 are substantially equal to the combustion chamber air pressure P4 because the main manifold 36 is in fluid communication, through the main fuel nozzles attached thereto, with the combustion chamber air pressure P4, while the fluid communication between passage 50 and passage 48 is closed. Therefore, a measured value $\Delta P$ of the differential pressure transducer 52 is equal to Pp–P4. The measured value $\Delta P$ can replace (Pp–P4) and can therefore be used to calculate the start fuel flow amount F, that is $F=FN(\Delta P)^{1/2}$. The software 61 for calculating the start fuel flow, includes the formulation $F=FN(\Delta P)^{1/2}$. The flow number of pilot nozzle 34 is determined by the configuration of the pilot nozzle 34 and the fuel system 28, which is known and is stored in the software.

During the engine start procedure, the fuel flow passage 50 and the main manifold 36 are generally in a dry condition, because in a previous operation of the engine the residue fuel existing the fuel system 28 has been purged back to the fuel source 32 by the residual air pressure remaining in the combustion chamber upon engine shutdown—however, this ecology function is not part of this concept and will not be further discussed in this application. Nevertheless, when the fuel from the previous engine operation remains in the fuel system 28, the fuel remaining in the fuel flow passage 50 and the main manifold 36 is substantially stationary and the stationary fuel pressure within the fuel flow passage 50 and the main manifold 36 is generally equal to the combustion chamber air pressure P4 or may be slightly different from P4 affected by the height of the fuel in the fuel flow passage 50 above the differential pressure transducer 52. Considering the value $\Delta P$ measured by the differential pressure transducer 52 being of in the order of 120 PSI maximum, the minor difference relative to the combustion chamber air pressure P4 caused by the fuel remaining in the fuel flow passage 50, is ignorable with respect to the accuracy of the start fuel flow calculation.

The combustion chamber air pressure P4 may vary during the engine start procedure and therefore the measured value $\Delta P$ of the pressure differential may also be a varying value. The start fuel flow calculation process is conducted at least until the light-off condition of the pilot nozzle 34 is detected. The instant result of the start fuel flow calculation is continuously used as an input of a controlling process of the rotational speed of the fuel pump 30 in order to provide an adequate amount of fuel to the pilot nozzle 34 for ignition.

In FIG. 4, during the engine start-up procedure the flow from the pilot nozzle 34 is lit up, upon which EEC 60 commands the fuel pump to increase the pump drive to establish a higher fuel pressure in order to force the minimum pressure/flow divider valve 38 to open both outlets 42 and 44 which results in a gradual and controlled increase in the fuel flow, as the compressor speed increases. Meanwhile, EEC 60 commands the flow equalization solenoid valve 58 to open the fuel flow passages 54, 56, thereby allowing fuel flow via both outlets 42, 44 through the fuel flow passage 50 to the main manifold 36 for establishing a properly distributed fuel flow between all nozzles and a stable combustion process in the combustor 25 of FIG. 1. At the same time, fuel flow 76 moves via outlet 42 of the minimum pressure/flow divider valve 38 through the fuel flow passage 48 to the pilot nozzle 34 to maintain the pilot flame. This process begins upon the light-up of the pilot nozzle 34 during the engine start procedure and will be maintained during engine operation for a stable combustion in the engine combustor 25.

The check valve 68 in fuel flow passage 66 does not allow fuel flow from the fuel pump 30 to pass the bypass formed by the fuel flow passages 64, 66, to the fuel flow passage 48. EEC 60 also commands the ecology solenoid valve 62 to close the bypass. Therefore, during the entire engine operation process, fuel is supplied from the fuel source 32 to the pilot fuel nozzle 34 and the main nozzles 37 of the main manifold 36 through the fluidic connection of the fuel system 28 via the minimum pressure/flow divider valve 38, but not via the closed bypass of fuel flow passages 64, 66.

The minimum pressure/flow divider valve 38 includes a leakage drain tube or duct 80 to collect any fuel that may leak along the length of the valve 38 to the location where the spring is located (not indicated). The leakage drain tube 80 is connected to the inlet side of the pump 32. The leakage drain tube 80 preferably serves to both (i) collect fuel that may leak past the valve 38 piston, and (ii) provide a reference pressure to the rear of the valve 38 piston, such that, if fuel is delivered under pressure to the inlet of the pump 32, the fuel pressure will not be capable of opening the minimum pressure/flow divider valve 38 to inadvertently cause a fuel flow before the pump 32 is deliberately rotated. It will be understood that the supply or boost pressure of the fuel delivered to the inlet of the main fuel pump will also appear at the outlet of the pump, and will therefore be applied to the minimum pressure/flow divider valve 38. However, since the leakage tube 80 permits this supply or boost pressure to also be applied to the other side of the minimum pressure/flow divider valve 38, pressure across the valve 38 piston is equalized, thus preventing the valve from inadvertently opening. Once the pump begins to rotate and generate pressure at its outlet, the minimum pressure/flow divider valve 38 will open, since the reference pressure provided by the leakage tube 80 does not increase when the pump is rotated, and thus a differential pressure across the valve 38 results.

The above description is meant to be exemplary only, and one skilled in the art will recognize that changes may be made to the embodiments described without departure from the scope of the invention disclosed. For example, the present teachings can be applied to various types of gas turbine engines other than a turbofan gas engine which is used as an example to illustrate one application hereof. Any suitable fuel nozzle(s) arrangement may be employed, and any suitable fuel system architecture may be employed—the invention is not limited to the nozzle or manifold arrangements described in the example. Any suitable manner of determining pressure differential may be used. A fuel system may include more or less components therein for various types of gas turbine engines without departing from the spirit of the invention disclosed, and may include but is not limited to fuel reheating devices. Still other modifications which fall within the scope of the invention disclosed will be apparent to those skilled in the art, in light of a review of this disclosure, and such modifications are intended to fall within the appended claims.

The invention claimed is:

1. A method for measuring a start fuel flow to a pilot nozzle in a fuel system of a gas turbine engine for ignition in a combustion chamber during an engine start procedure, the fuel system including a first fuel passage leading to the pilot nozzle and a second fuel passage leading to a main manifold, both the pilot nozzle and main manifold being in fluid communication with the combustion chamber, the method comprising:
   a) measuring a pressure differential between the first fuel passage and the second fuel passage while the start fuel flow is being directed through the first fuel passage to the pilot nozzle, until a light-up condition of the pilot nozzle is detected; and
   b) calculating the start fuel flow using a flow number of the pilot nozzle and a measured value of the pressure differential.

2. The method as defined in claim 1, further comprising a step of determining the flow number of the pilot nozzle.

3. The method as defined in claim 1, wherein direct fluid communication between the first and second fuel passages is terminated at least until the light-up condition of the pilot nozzle is detected.

4. The method as defined in claim 2, wherein the second fuel passage and the main manifold are substantially empty of fuel until the light-up condition of the pilot nozzle is detected.

5. The method as defined in claim 3, wherein in step (c) a formula $F=PN(\Delta P)^{1/2}$ is used, in which F is an amount of the start fuel flow, PN is the flow number of the pilot nozzle and $\Delta P$ is the measured value of the pressure differential.

6. An apparatus for determining a start fuel flow to a pilot nozzle of a fuel system for ignition in a combustion chamber of a gas turbine engine, the apparatus comprising:
   a differential pressure transducer connected between first and second fuel passages of the fuel system, the first fuel passage leading to the pilot nozzle and the second fuel passage leading to a main manifold, both the pilot nozzle and the main manifold being in fluid communication with the combustion chamber; and
   means for calculating the start fuel flow using a known flow number of the pilot nozzle and a measured value of the differential pressure transducer.

7. The apparatus as defined in claim 6, further comprising an equalization valve connected in parallel with the differential pressure transducer between the first and second fuel passages to selectively terminate direct fluid communication between the first and second fuel passages.

8. The apparatus as defined in claim 6, wherein the means comprises a software including a calculation formula $F=PN(\Delta P)^{1/2}$, in which F is an amount of the start fuel flow, PN is the known flow number of the pilot nozzle and $\Delta P$ is the measured value of the differential pressure transducer.

9. A fuel system of a gas turbine engine, comprising:
   a fuel pump for pressurizing fuel from a fuel source;
   at least a first nozzle in fluidic communication with a combustion chamber of the engine;
   at least a second nozzle in fluidic communication with the combustion chamber of the engine;
   a fluidic connection extending from the fuel pump and dividing into at least first and second passages leading to the respective first and second nozzles;
   a differential pressure transducer connected between the first and second passages of the fluidic connection for measuring a pressure differential between the first and second passages; and
   a control unit in contact with the fluidic connection for controllably operating the fuel system, the control unit including a device for using a measured value of the differential pressure transducer to calculate a start fuel flow through the first passage before a light-up condition of the first nozzle is detected.

10. The system as defined in claim 9, further comprising a pressure valve adapted (1) to prevent fuel from flowing through the fluidic connection to the respective first and second nozzles when a fuel pressure created by the fuel pump varies to become lower than a first value; (2) to allow fuel to flow only through the first passage to the first nozzle when the fuel pressure varies to become higher than the first value and lower than a second value; and (3) to allow fuel to flow through both the first and second passages to the respective first and second nozzles when the fuel pressure varies to become higher than the second value.

11. The system as defined in claim 10, further comprising a first on-and-off valve associated with a bypass passage over the pressure valve, to selectively open and close the bypass passage.

12. The system as defined in claim 11, further comprises a second on-and-off valve between the first and second passages of the fluidic connection, in a parallel relationship with the differential pressure transducer for selectively opening and closing a direct fluid communication between the first and second passages.

13. The system as defined in claim 11, further comprising a check valve in the bypass passage.

14. The system as defined in claim 12, wherein the first and second on-and-off valves are controlled by the control unit.

15. The system as defined in claim 9, wherein the differential pressure transducer has a maximum pressure indication smaller than a maximum fuel pressure in the system established by the fuel pump.

16. The system as defined in claim 9, wherein the differential pressure transducer has a maximum pressure indication smaller than 150 PSI.

* * * * *